July 8, 1941.  G. W. NEWTON  2,248,184
APPARATUS FOR CARBONATING LIQUIDS
Filed May 2, 1939  3 Sheets-Sheet 2

Inventor
George W. Newton
By Cushman Darby Cushman
Attorney

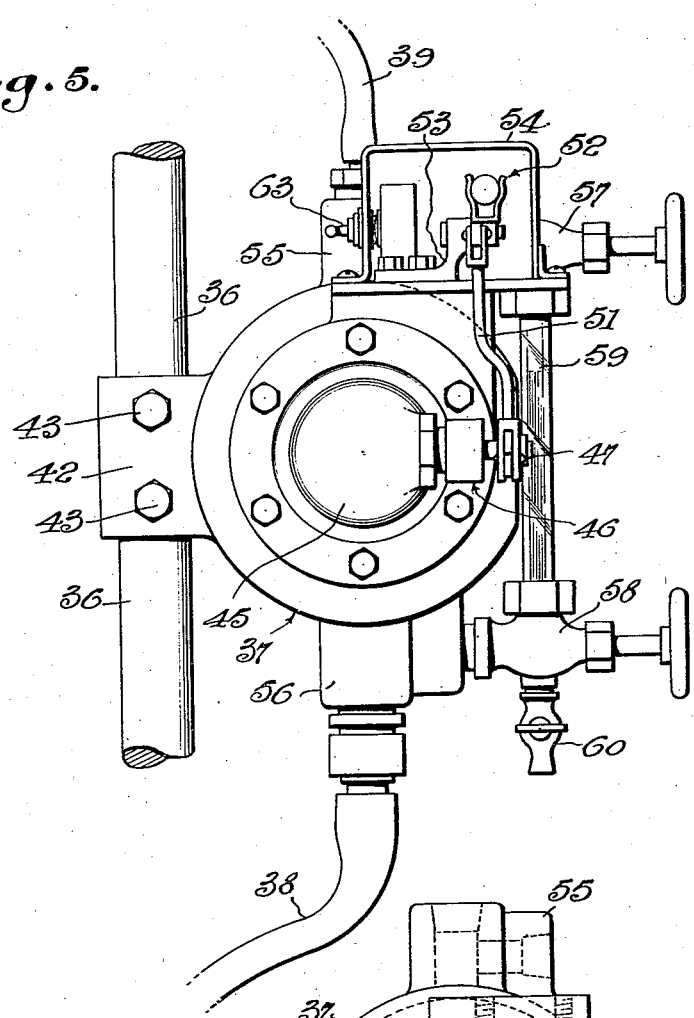
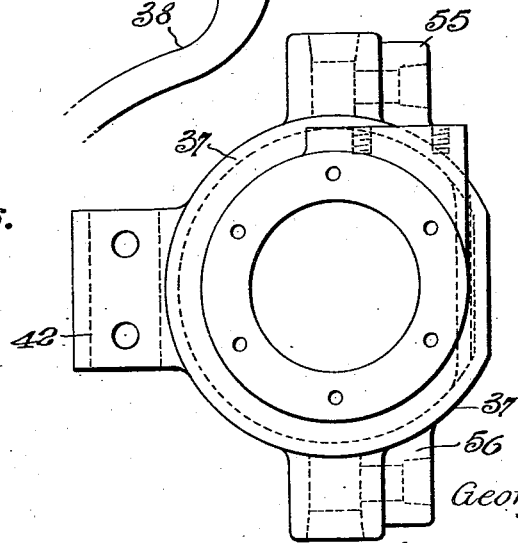

Patented July 8, 1941

2,248,184

UNITED STATES PATENT OFFICE 2,248,184

APPARATUS FOR CARBONATING LIQUIDS

George W. Newton, Baltimore, Md., assignor to Crown Cork & Seal Company, Inc., Baltimore, Md., a corporation of New York Application May 2, 1939, Serial No. 271,381

3 Claims. (Cl. 261—24)

The present invention relates to an apparatus for producing carbonated water, or other beverages. It is a primary object of the invention to provide a carbonator of the stationary type (characterized by the absence of paddles or beaters) which is extremely efficient in operation and with which carbonated liquids of varying, accurately controlled degrees of saturation can be produced.

The invention provides a novel, variable control for the degree of saturation or carbonation of the liquid produced in the apparatus. The control is extremely simple and is entirely accurate in operation.

It is well known that water has a natural affinity for carbon dioxide gas. A given volume of water is capable of absorbing a definite volume of gas, depending upon the time of exposure of the water to the gas, the area of the water exposed, the temperature of the water and the pressure on the gas. Thus, in determining the amount of gas that will be absorbed by the water, the factors of temperature, pressure, surface area and time of exposure must be considered. By varying one, while maintaining the others constant, the amount of gas absorbed can be varied.

In United States Patent No. 1,972,994, issued to Huntley and Stewart, on September 11, 1934, a method of and apparatus for controlling the degree of saturation are disclosed. In that case, the degree of carbonation may be varied by changing the volume of the stream of water flowing through the apparatus, while maintaining the other factors constant. The present invention is an improvement over the apparatus of that patent. In the present case, the control of the degree of saturation is effected by controlling the area of the water in contact with the gas, and by varying the time of exposure.

This variation in film area is effected in an extremely simple and efficient manner, by raising the level of the water in the tank so as to submerge or otherwise render ineffective, certain of the film forming means in the tank. By so raising the water lever, the area over which the water films and flows in contact with the gas is decreased a predetermined desired amount, thereby decreasing the amount of gas that the water can absorb at that particular temperature and pressure.

In the accompanying drawings, an illustrative embodiment of an apparatus in accordance with the present invention is disclosed, but it must be understood that the invention is not limited to the details of construction shown therein and described below.

In the drawings:

Figure 5 is a side elevation of the float chamber, and

Figure 6 is a similar view of the chamber alone, with certain parts removed.

Figure 1:
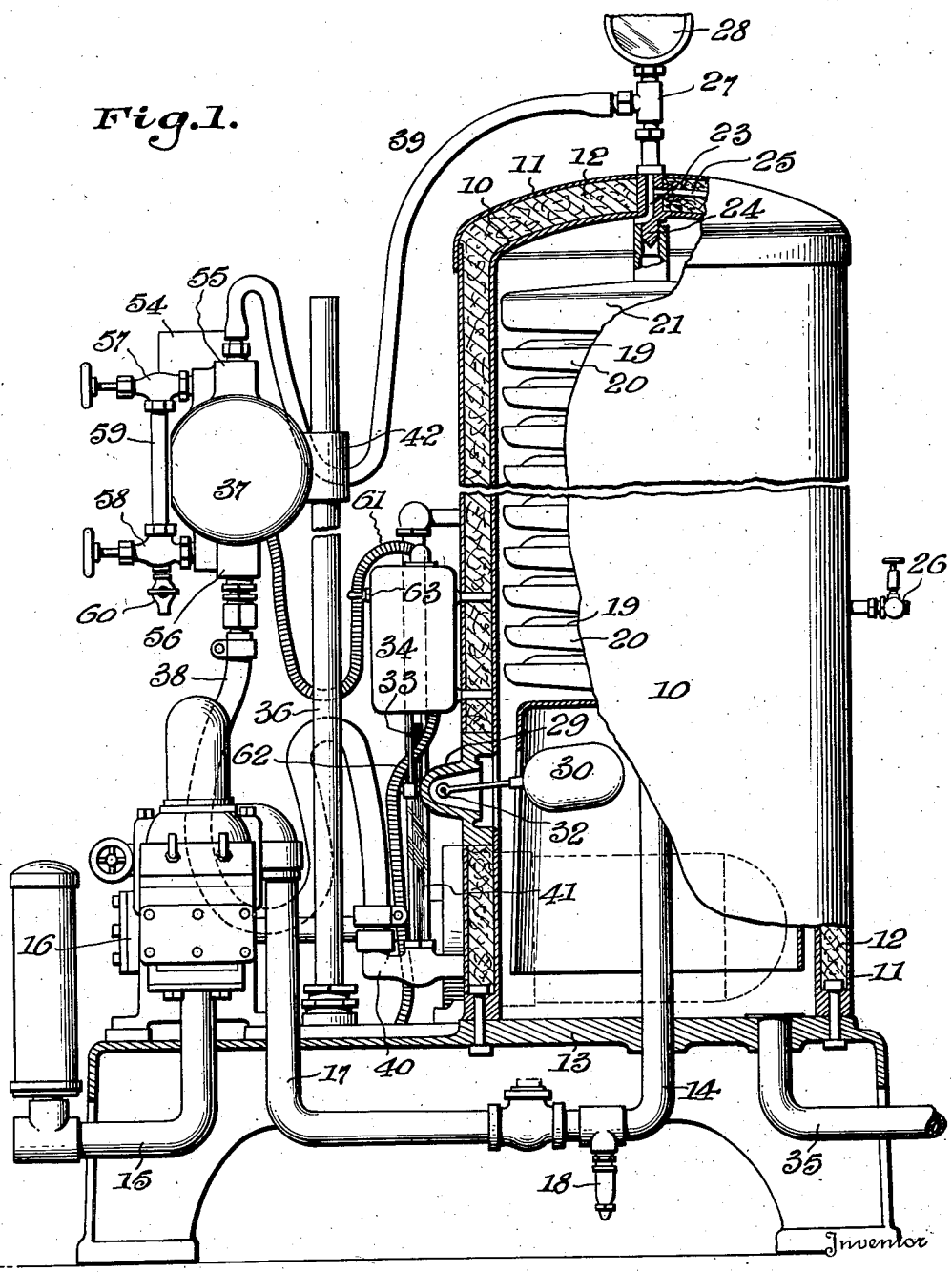
Figure 1 is a side view of the apparatus, partly in elevation and partly in section.
Figure 2:
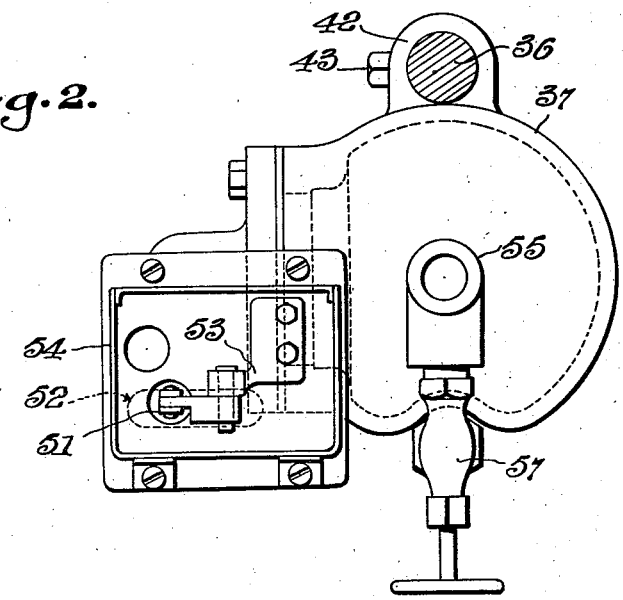
Figure 2 is a plan view of the adjustable float chamber associated with the machine.
Figure 3:
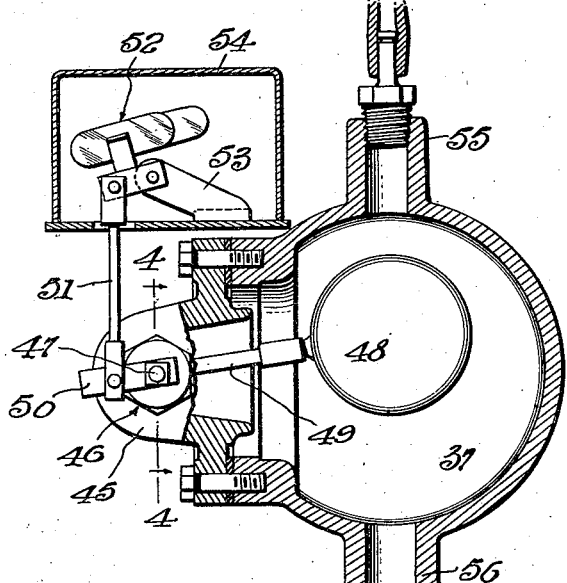
Figure 3 is a vertical sectional view of the same.
Figure 4:
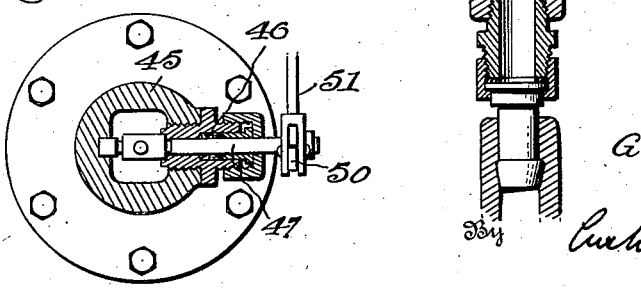
Figure 4 is a fragmentary sectional view taken on line 4—4 of Figure 3.

The carbonating apparatus proper is, in many respects, similar to that shown in the aforementioned patent. A tank 10 is encased in an outer sheet metal shell 11, thereby providing a space in which heat insulating material 12 is packed. The tank and casing are supported upon a base casting 13, through which a water inlet pipe 14 projects upwardly into the tank. Water from any suitable source is conducted through a pipe 15 to a pump 16, driven by an electric motor, and thence through pipes 17 and 14, from which it is forced into the tank under pressure. Carbon dioxide gas is admitted to the tank through a gas inlet check valve (not shown) disposed in the side of the tank. A safety valve 18, normally set at 175 pounds, is preferably disposed in the water inlet pipe 17.

The pipe 14, interiorly of the tank 10, serves as a supporting means for a plurality of filming plates 19, 20. The water is sprayed outwardly through jets, not shown, into the interior of an upper casing 21, where it flows downwardly and inwardly over the bottom surface and passes through apertures adjacent the central supporting pipe 14. The water then films and flows outwardly on the plate 19 and cascades over the down-turned outer edge thereof, where it is caught and collected by the filming plate 20. The water then flows inwardly over the surface of the plate 20 toward the center, until it again cascades through inwardly positioned openings therein and falls upon the next plate 19. This action continues and the water flows outwardly and inwardly in a labyrinthine path, in the form of a thin film over the surfaces of the several filming plates.

The tank 10, of course, is filled with an atmosphere of carbon dioxide gas at a desired, predetermined pressure, governed by a conventional pressure regulator, not shown. A conduit 23, formed in the axial plug 24 secured in the head of the tank, has a branch conduit 25 leading to a valve 26, in order that any air collecting in the upper end of the tank may be snifted off to atmosphere. Another branch of the conduit 23 leads through a T-fitting 27 to a pressure gauge 28, to advise the operator constantly as to the gas pressure conditions in the tank.

During the normal operation of the carbonator, when substantially completely saturated water is being produced, the action of the pump 16 is controlled by a float 30, pivoted at 32 in a special fitting 29 secured to the side of the tank. Through a link 33, the float controls a mercury switch in a box 34. Thus, when carbonated water has been drawn off through the discharge pipe 35, so that the level of the water in the lower, collecting portion of the tank drops to a predetermined level, the float shifts the switch in the box 34 to start the motor and force water into the upper end of the tank. The water films out and flows over the plates in the tank and absorbs carbon dioxide gas. When the supply in the collecting portion of the tank has been replenished, and the water level has been raised to a predetermined point, the float 30 is raised and the switch cuts off the motor. During the normal operation of the apparatus in this manner, the water flows over the surfaces of all of the plates in the tank. Thus, a predetermined constant surface area of water is exposed to the gas. Hence, if the temperature and pressure conditions are maintained constant, a carbonated water of predetermined constant degree of saturation is produced.

If it is desired to produce carbonated water having a lesser degree of saturation, such as is required for certain types of beverages, this result can be accomplished by rendering certain of the plates 19, 20 ineffective. To this end, a vertically disposed post 36 is mounted on the base 13, so as to serve as a support for a supplemental float chamber 37, having a connection through a flexible hose 38 with the lower end of the tank, and, through a second hose 39, with the upper end. Preferably, the hose 38 is connected to a lateral extension 40 on the fitting which carries the sight gauge 41. The hose 39 may be connected to the lateral extension of the T-fitting 27 at the upper end of the tank. Hence, the interior of the casing 37 is in communication with the interior of the tank, and the pressure conditions are the same in both.

The casing 37 is supported on the post 36 by a laterally projecting boss 42 having set screws 43 or the like, threaded through its side into contact with the post, to clamp the casing in any desired vertical position.

One side of the casing 37 is closed by a special casting 45, similar to the fitting 29, associated with the tank 10. A stuffing box 46 supports a rock shaft 47, which is connected at its inner end to a float 48 through an arm 49. At its outer end the shaft 47 has an arm 50, connected through a link 51 to a mercury switch 52, mounted on a fixed arm 53 within the switch box 54.

The float chamber 37 is provided with upper and lower bosses 55, 56, which are bored to receive valves 57, 58, supporting between them a sight gauge 59. A drain cock 60 may be associated with the lower valve 58.

The main switch box 34 and the supplemental switch box 54 are interconnected to each other and to the motor by electric conduits 61, 62. Manually controlled switches 63 are associated with each box, so that the mercury switch therein can be cut out, to render the associated float 30 or 48 ineffective. Thus, the manual switch associated with the box 34 can be set so that the float 30 will not terminate the operation of the pump. When so set, the pump will continue its operation until the water level in the tank and in the conduit 38 and the supplemental float chamber rises sufficiently to lift lift the ball float 48, whereupon the mercury switch 52 will be actuated to cut off the current to the motor and stop the pump. Hence, the water will be maintained at a level in the tank corresponding to the position of the chamber 37. When water is drawn off through the outlet pipe 35, so that the water level drops, the ball pipe 48 will actuate the mercury switch 52 to replenish the supply.

The chamber 37, as previously pointed out, is mounted for vertical adjustment on the post 36. Hence, the water level in the tank can be varied through wide limits. When the level is raised, certain of the plates 19 and 20 are submerged in the carbonated water in the tank. As a result, the stream of water cannot film out and flow over those plates, and the surface area of the flowing stream in contact with the atmosphere of carbon dioxide gas in the tank is correspondingly decreased. Therefore, the degree of saturation of the water is decreased and accurately controlled, simply by changing the vertical position of the float chamber 37.

Accurate control of the degree of saturation of the water produced by a carbonator is of great utility. For instance, with certain types of beverages, such as carbonated orange juice and the like, which contain a substantial volume of vegetable matter or pulp, a low degree of saturation is desired, as compared with syrup beverages or plain carbonated water. For instance, certain "cola" type beverages require carbonated water having three and one-half volumes of gas, while in gingerale, a higher degree of carbonation, such as four volumes of gas is desired. For orange beverages, water having in the neighborhood from two to two and one-half volumes is preferred, to prevent excessive foaming. To produce carbonated water having two and three-tenths volumes of gas, the water level in the tank is simply raised, by raising the adjustable float chamber 37 so as to cut out between one-third and one-half of the plates in the tank.

It must be understood that it is unnecessary to use two floats, as shown in the accompanying drawings. The float 30 and its associated electrical devices can be eliminated entirely. In such a case, the supplemental float chamber 37 may be lowered to substantially the position occupied by the float 30 in the accompanying drawings to perform the function of the latter. If it is desired to produce even more highly carbonated water than the normal, the float 37 can be dropped to a still lower position. Thus, a wide range of the degree of carbonation can be effected by the apparatus of the present invention.

I claim:

1. Apparatus for producing carbonated water in variable, controlled degrees of partial saturation, comprising a tank adapted to contain an atmosphere of carbon dioxide gas under predetermined, substantially constant pressure, a plurality of substantially horizontally disposed plates arranged in superimposed relation in a vertical series in the tank, means for intermittently delivering to the upper portion of the tank a stream of water of predetermined volume to cause the water in the stream to film and flow a single time only in a labyrinthine path over said plates in gas-absorbing contact with said atmosphere and to be collected in substantially quiescent state in the lower portion of the tank, and means for varying the number of plates over which the stream films and flows and hence the film-area of the stream in gas-absorbing contact with said atmosphere, said last-named means comprising a float chamber disposed exteriorly of the tank, means connecting its interior with the interior of the tank at upper and lower points, whereby the water in the chamber assumes the level of the water in the tank, a float in the chamber adapted to move relative to the chamber in response to changes in the level of the water therein, means actuated by movement of the float relative to the chamber for controlling said stream introducing means, whereby the level of the water in the tank and in the chamber is maintained in substantially constant predetermined relation to the chamber, and means for bodily adjusting the chamber vertically relative to said tank to raise the level of the water in the tank and thereby to submerge below said water level a desired number of the filming plates in the tank.

2. Apparatus in accordance with claim 1, characterized in that said float serves to control an electric circuit which, in turn, controls the stream introducing means.

3. Apparatus in accordance with claim 1, characterized in that the stream introducing means includes an electric motor and a pump driven thereby, and in that the movements of the float in the chamber control the electric circuit for the pump motor.

GEORGE W. NEWTON.